No. 898,082. PATENTED SEPT. 8, 1908.
W. WOLFE.
BRAKE FOR VEHICLES.
APPLICATION FILED AUG. 22, 1907.
2 SHEETS—SHEET 1.
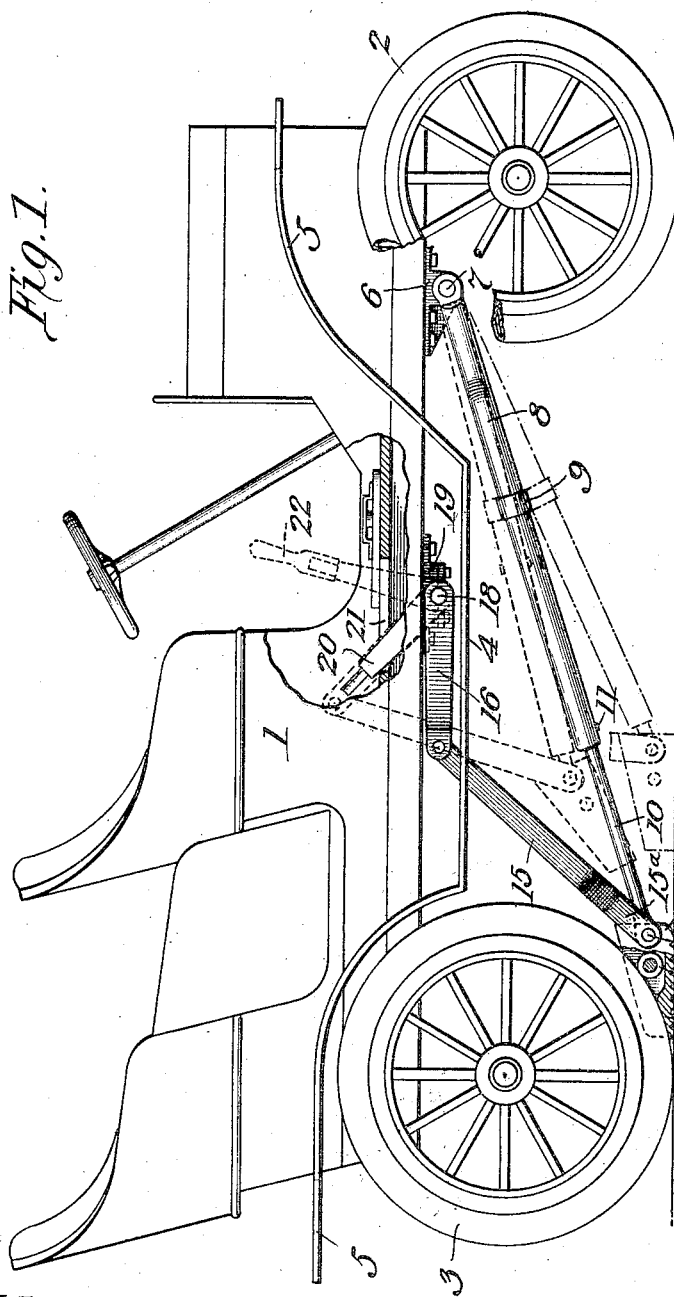
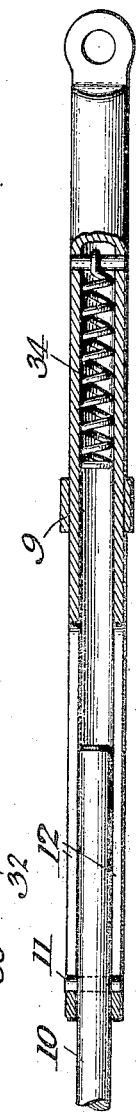
Witnesses:
G. M. Stucker
E. H. Bickerton
Inventor
William Wolfe.
By Meyers, Cushman & Rea,
Attorneys.

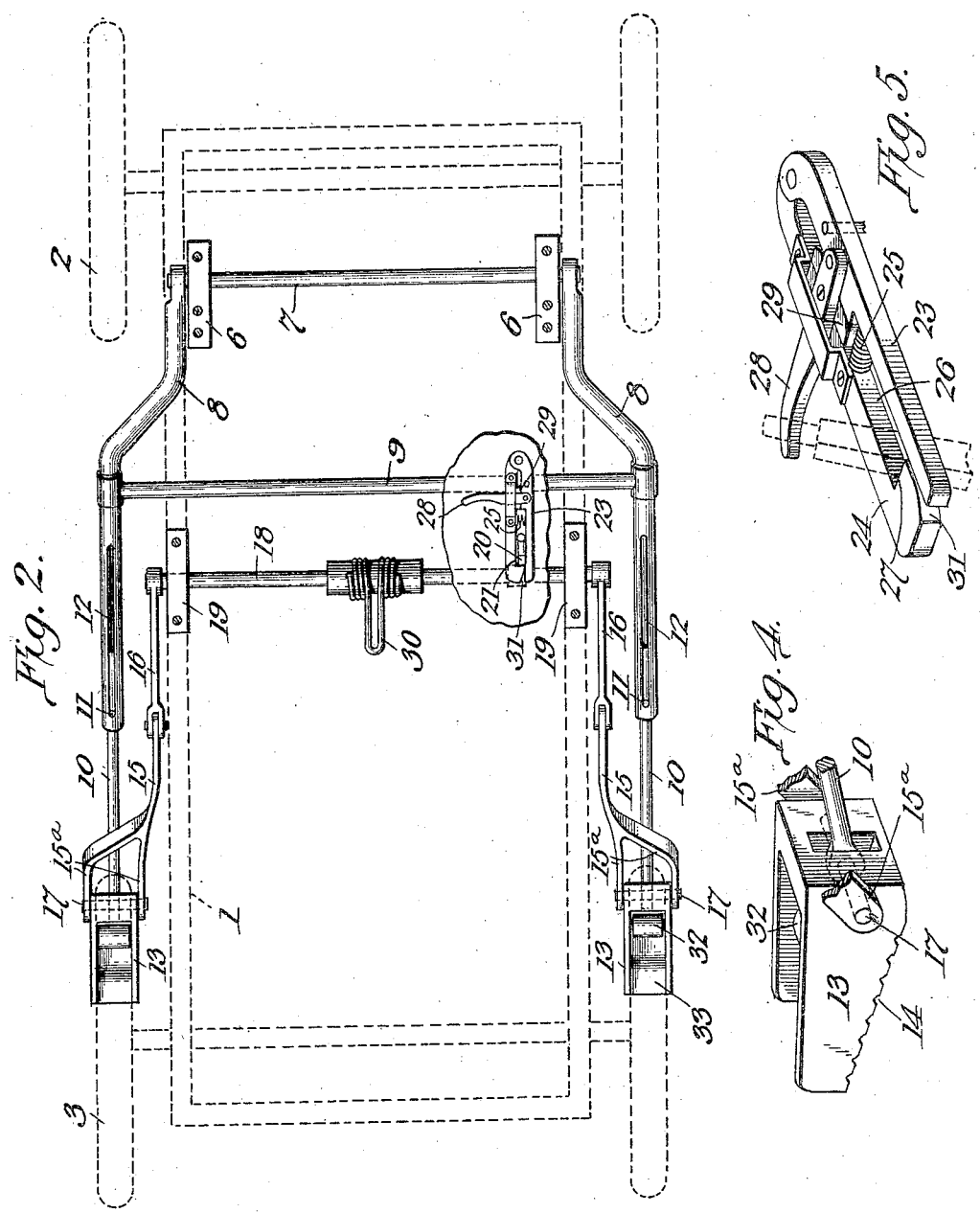

UNITED STATES PATENT OFFICE.

WILLIAM WOLFE, OF PATTON, PENNSYLVANIA.

BRAKE FOR VEHICLES.

No. 898,082.　　　Specification of Letters Patent.　　　Patented Sept. 8, 1908.

Application filed August 22, 1907. Serial No. 389,644.

*To all whom it may concern:*

Be it known that I, WILLIAM WOLFE, a citizen of the United States, residing at Patton, in the county of Cambria and State of Pennsylvania, have invented new and useful Improvements in Brakes for Vehicles, of which the following is a specification.

My invention relates to improvements in brakes for vehicles and is intended more particularly, though not exclusively, as an emergency brake for motor-driven vehicles where the occasion frequently arises for quickly arresting the movement of the vehicle.

The invention has for its object the provision of a simple and effective brake which may be applied quickly, and when used upon a motor-driven vehicle without first cutting out the motor.

Experience has shown that in the use of motor-driven vehicles occasions arise where it is necessary in order to avoid accident that the vehicle be stopped very quickly. The ordinary brake equipment of such vehicles does not admit of this because it is essential first to cut out the motor and then apply the brake. Two operations are, therefore, necessary the performance of which requires time which may be fatal, and again when the emergency arises the driver of the vehicle is very apt to become confused and throw on the brake before cutting out the motor, in which case the brake not only has to resist the momentum of the vehicle but the positive forward driving action of the motor, with the result that the vehicle cannot be stopped as quickly or within the short distance necessary to meet the emergency. A vehicle equipped with a brake according to my invention avoids these difficulties as the driver has only to apply the brake, which may be done instantaneously, without paying any attention whatever to the motor, thus saving time, and, since the motor may be disregarded, without confusion.

That which is regarded as new will be set forth in the claims following the description.

In the accompanying drawings illustrating that which I regard as the best known embodiment of my invention, Figure 1 is a conventional view of a motor-driven vehicle partly in section equipped with the brake of my invention. Fig. 2 is a top plan view of the brake. Fig. 3 is a sectional view of the brake-shoe-carrying drop-frame. Fig. 4 is a perspective view of the brake shoe. Fig. 5 is a perspective view of the lock for holding the brake mechanism in normal position.

In the said drawing the reference numeral 1 designates the body of a motor-driven vehicle, shown conventionally, 2 the front steering and 3 the rear driving wheels, and 4 the usual step and 5 the mud-guards. Beneath the bed of the vehicle journaled in brackets 6 in advance of the wheels to be braked is arranged a yoke-shaped drop frame comprising an axle 7 and arms rearwardly extending 8. The axle is shown as a separate element to which the arms are suitably secured. The entire drop frame including the axle may obviously, however, be made in one piece. Preferably and as shown the arms 8 are made of metallic tubing and are braced by a spanner 9. Telescopically arranged in the tubular ends of the arms 8 are rods or pistons 10 the extremes of position of said rods or pistons being limited by a stop, one suitable form of which is shown as consisting of a pin 11 with which the rods are provided and which work in slots 12 in the tubular arms. On the free ends of said rods or pistons 10 are pivotally mounted brake-shoes 13 designed to be projected against the driving-wheels 3 and also against the earth or other surface over which the vehicle may be moved, to serve as a drag chock-brake. If desired, and preferably, this shoe is provided with a roughened surface 14. Connected to the drop-frame and preferably directly to the brake-shoes are linked levers 15, 16 the levers 15 having yoke ends 15ª between which the shoe is arranged and to which it is pivotally connected as by means of a pin 17. The levers 15, 16 are shown as working between the body of the vehicle and the step 4, and the lower ends of levers 15 are flared away from the body of the vehicle as best shown in Fig. 2 to the end that when the brake is not in action it will lie under the step 4 and be out of the way. The levers 16 are connected to a rock shaft 18 Fig. 2 journaled in bearings 19 beneath the vehicle bottom and in advance of the wheels to be braked and to this rock shaft is secured a handle 20 passing through a slot 21 in the vehicle bed or bottom within reach of the operator. When a locking means of the type shown in the drawings is employed the handle 20 may be short so as to take up very little room in the vehicle and a detachable hand grip 22 provided which may be slipped on to the handle when it is desired to withdraw the brake after application.

In connection with the brake-system shown is combined a lock, the preferable but not exclusive form of which is illustrated in the drawing. The lock serves to maintain the brake normally in inactive position and release it instantaneously when application of the brake is desired. This lock as shown is secured to the bed or bottom of the vehicle within easy reach of the foot of the driver and consists of stationary arm 23 rigidly connected to the vehicle bottom, and a movable keeper 24 pivotally connected thereto and normally held there against by a coiled spring 25 or other suitable device. The keeper is cut away to form an opening 26 coincident with the opening 21 in the bed bottom and in which the handle 20 is disposed when the brake is off. The end wall of this recess constitutes a nose 27 against which the handle 20 bears to support the drop-frame and the brake-shoes combined therewith normally in the elevated position shown in dotted lines in Fig. 1. A foot-lever 28 is provided for withdrawing the nose of the keeper from in front of the handle when it is desired to apply the brake, and as shown this lever is pivoted to the fixed arm 23 and is provided with a block 29 interposed between said fixed arm and the pivoted keeper, the arrangement being such that when the foot-lever is thrown forward the block will throw the keeper away from the fixed arm 23 and release the handle, whereupon the drop-frame will descend by gravity aided if desired by a spring or equivalent 30 secured to the rock shaft 18 and bearing against the bottom of the vehicle. When the handle is operated to restore the brake to normal position after application it rides upon the cam-face 31 of the keeper 24 and pushes the latter aside until the nose 27 is passed whereupon said nose snaps in front of the handle under the impulse of the spring 25 and the foot-lever 28 is restored to normal position ready for further operation as before described.

In order to prevent the possibility of the traction of the drive wheels on the brake-shoe before the motor is cut out breaking or dismembering some portion of the brake-system, which would likely otherwise occur, I provide the brake-shoe with traveling wheel-contact surfaces, such as rollers 32 against which the wheel moves, and in order to prevent the motor-machinery racing, which would likely occur if the drive-wheels worked only against a moving surface such as the rollers, I provide the brake-shoes with stationary wheel-contact friction surfaces 33 against which wheels work with sufficient friction to put some load on the machinery and prevent racing thereof.

In operation when an emergency arises, the operator has merely to operate the foot-lever 28 which releases the handle 20 and the drop-frame descends by gravity, assisted if desired by the spring 30, until the brake-shoes meet the earth or other surface over which the vehicle is moving, as seen in dotted lines Fig. 1, and instantaneously, by traction, the pistons or rods 10, which are normally telescoped within the tubular ends of the drop-frame as shown, assume the drag chock position shown in full lines in said figure and effectually stop the machine. Springs 34 may be arranged in the tubular ends of the drop-frame to assist in the projection of the rods 10 or to give them a start. This operation may be accomplished without cutting out the driving-motor of the vehicle as the driving wheels rotate idly on the rollers 32 of the brake-shoes and the driver may at his leisure, after having applied the brake, cut the motor out.

To release the brake, the handle 20 is manipulated, and through the connecting medium such as the linked levers, and by reason of the relative disposition of the pivotal point of the drop-frame and the place of the application of force to the linked levers or equivalent connecting mechanism, that is to say, in advance of the wheels to be braked, the brake-shoes are drawn forwardly out of contact with the wheel, the rods or pistons 10 being telescoped into the arms 8 of the drop-frame against the tension of the springs 34, when the latter are used, and during the manipulation of the handle 20 the drop frame is also lifted up beneath the bottom of the vehicle into inactive position.

Having thus described my invention what I claim is:—

1. A vehicle-brake, comprising a drop-frame pivotally connected to the vehicle body in advance of the wheels to be braked and provided with arms extending toward the wheels to be braked, brake-shoe carriers telescopically combined with the arms of said drop-frame, brake-shoes secured to said carriers in advance of the wheels to be braked, mechanism operatively connected to the said brake-shoe carriers, and means for operating said mechanism arranged to exert its influence from a point in advance of the wheels to be braked, whereby a manipulation of said means operates to telescope said brake-shoe carriers, withdraw the brake-shoes forwardly from engagement with the wheels and lift the drop-frame, substantially as described.

2. A vehicle-brake, comprising a drop-frame pivotally connected to the vehicle body in advance of the wheels to be braked and provided with arms extending toward the wheels to be braked, brake-shoe carriers telescopically combined with the arms of said drop-frame, brake-shoes secured to said carriers in advance of the wheels to be braked, lever mechanism operatively connected to the said brake-shoe carriers, and means for operating said mechanism arranged to exert its influence from a point in advance of the wheels to be braked, whereby a manipulation of said means operates to telescope said brake-shoe carriers, withdraw the brake-shoes forwardly from engagement with the wheels and lift the drop-frame, substantially as described.

3. A vehicle-brake, comprising a drop-frame pivotally connected to the vehicle body in advance of the wheels to be braked and provided with arms extending toward the wheels to be braked, brake-shoe carriers telescopically combined with the arms of said drop-frame, brake-shoes secured to said carriers in advance of the wheels to be braked, provided with traveling and stationary friction surfaces for engaging the wheels to be braked, mechanism operatively connected to the said brake-shoe carriers, and means for operating said mechanism arranged to exert its influence from a point in advance of the wheels to be braked, whereby a manipulation of said means operates to telescope said brake-shoe carriers, withdraw the brake-shoes forwardly from engagement with the wheels and lift the drop-frame, substantially as described.

4. A vehicle-brake, comprising a drop-frame pivotally connected to the vehicle body in advance of the wheels to be braked and provided with arms extending toward the wheels to be braked, brake-shoe carriers telescopically combined with the arms of said drop-frame, brake-shoes secured to said carriers in advance of the wheels to be braked, mechanism operatively connected to the said brake-shoe carriers, means for operating said mechanism arranged to exert its influence from a point in advance of the wheels to be braked, whereby a manipulation of said means operates to telescope said brake-shoe carriers, withdraw the brake-shoes forwardly from engagement with the wheels and lift the drop-frame, a lock comprising a pivoted keeper for engaging said means to hold the brake in inactive position, and a foot lever for withdrawing said keeper and permitting automatic application of the brake.

5. A vehicle-brake, comprising a drop-frame pivotally connected to the vehicle body in advance of the wheels to be braked, brake-shoes telescopically connected with said drop-frame and located in advance of the wheels to be braked, and means for releasing the brake mechanism for automatic application and means for withdrawing the same from the engagement with the wheels.

6. A vehicle-brake, comprising a drop-frame pivotally connected to the vehicle body in advance of the wheels to be braked, brake-shoes provided with a traveling wheel-contact, telescopically connected with said drop-frame, and located in advance of the wheels to be braked, and means for releasing the brake-mechanism for automatic application and means for withdrawing the same from engagement with the wheels.

7. A vehicle-brake, comprising a drop-frame pivotally connected to the vehicle body in advance of the wheels to be braked, brake-shoes provided with a traveling wheel-contact and a stationary friction wheel-contact, telescopically connected with said drop-frame, and located in advance of the wheels to be braked, and means for releasing the brake-mechanism for automatic application and means for withdrawing the same from engagement with the wheels.

In testimony whereof I have hereunto set my hand in presence of two subscribing witnesses.

WILLIAM WOLFE.

Witnesses:
J. E. DALE,
FRANK L. BROWN.